United States Patent [19]

Shibata

[11] Patent Number: 4,493,072
[45] Date of Patent: Jan. 8, 1985

[54] TURNTABLE DEVICE HAVING ROTARY RECORDING MEDIUM SIZE CHANGEOVER CAPABILITY IN A ROTARY RECORDING MEDIUM REPRODUCING APPARATUS

[75] Inventor: Norio Shibata, Yokohama, Japan

[73] Assignee: Victor Company of Japan, Ltd., Yokohama, Japan

[21] Appl. No.: 269,896

[22] Filed: Jun. 3, 1981

[30] Foreign Application Priority Data

Jun. 3, 1980 [JP] Japan .......................... 55-76861[U]

[51] Int. Cl.³ .............................................. G11B 3/62
[52] U.S. Cl. .................................................. 369/271
[58] Field of Search ............... 369/271, 270, 263, 264

[56] References Cited

U.S. PATENT DOCUMENTS 3,608,909  9/1971  Rabinow ........................... 369/271

FOREIGN PATENT DOCUMENTS 126004  9/1979  Japan .................................. 369/271

Primary Examiner—Steven L. Stephan
Attorney, Agent, or Firm—Posnack, Roberts, Cohen & Spiecens

[57] ABSTRACT

A turntable device having rotary recording medium size changeover capability in a rotary recording medium reproducing apparatus, comprising a turntable driven in rotation by a rotation driving source, a turntable sheet carried on the turntable for carrying and supporting a rotary recording medium thereon thereby to unitarily rotate therewith, a spindle for the turntable, an air suction pump, and a communicating structure providing communication between the air suction pump and enclosed spaces formed between the turntable sheet and the rotary recording medium. The turntable has a first group of suction grooves of predetermined patterns. The turntable sheet has a second group of suction grooves of predetermined patterns. The turntable sheet is changed over according to the size of the rotary recording medium adhered onto the upper surface of the turntable sheet, upon a rotational setting operation in which the turntable sheet is rotated by a predetermined angle to vary the communication between the first and second groups of the suction grooves of the turntable and the turntable sheet.

7 Claims, 4 Drawing Figures

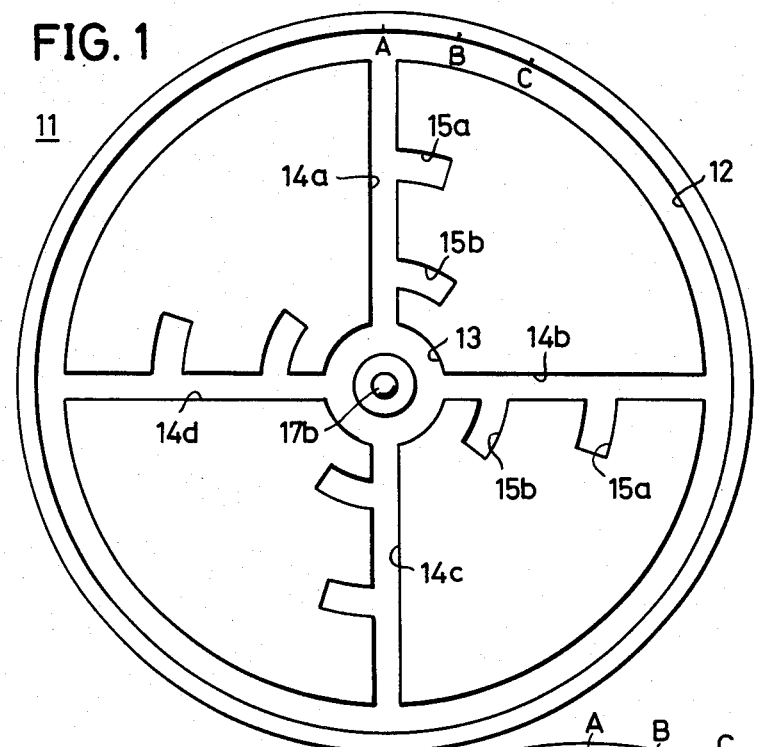
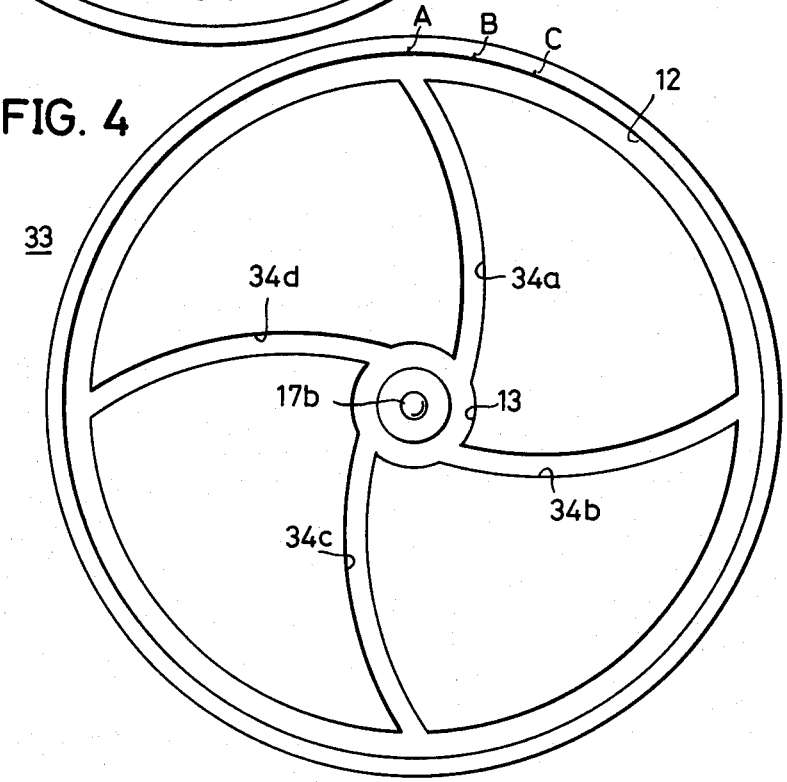

TURNTABLE DEVICE HAVING ROTARY RECORDING MEDIUM SIZE CHANGEOVER CAPABILITY IN A ROTARY RECORDING MEDIUM REPRODUCING APPARATUS

BACKGROUND OF THE INVENTION

The present invention relates generally to turntable devices having rotary recording medium size changeover capabilities in rotary recording medium reproducing apparatuses, and more particularly to a turntable device having rotary recording medium size changeover capability in a rotary recording medium reproducing apparatus, which is capable of positively adhering rotary recording mediums of various sizes onto the upper surface of a turntable sheet in a state where the lower surface of the turntable sheet is adhered substantially throughout the entire surface with respect to a turntable, by a simple setting operation in which the turntable is rotated by a small amount.

Heretofore, in apparatuses for reproducing rotary recording mediums such as record discs, the record disc which is to be reproduced, has been merely been placed on a turntable. In such apparatuses, if the record disc is warped, the record disc will rotate in a warped state, and will not make a close contact with the turntable (a state referred to as "poor adherence"). When the record disc rotates in a warped state, the pickup arm (tone arm) is adversely caused to swing in vertical directions, following the warp of the record disc. As the pickup arm swings, the reproducing stylus in the pickup cartridge of the pickup arm is displaced in the longitudinal direction of the sound groove in the record disc. Accordingly, the reproduced signal is subjected to frequency modulation, and wow is introduced. Furthermore, the warp of the record disc causes the cantilever pickup arm to undergo rotational displacement beyond the normal range. Hence, the moving magnet or the like adapted to undergo vibratile motion in accordance with the signal recorded in the sound groove, is also displaced beyond the normal range, resulting in a loss of the linearity in the power generating efficiency. As a consequence, amplitude modulation and distortion are produced.

Moreover, if the record disc is poorly adhered to the turntable, sound from the speaker units will be fed back to the record disc in an acoustic manner, and the resulting howling phenomenon will deteriorate the quality of the reproduced sound.

Furthermore, in a rotary recording medium such as a video disc, the warp of the disc causes fluctuations in the contact state between the reproducing stylus and the rotary recording medium, thus impairing satisfactory reproduction.

Accordingly, apparatuses have been proposed for maintaining the record disc in close contact with the turntable, so as to eliminate the above described problems. In one of such apparatuses, the warp is eliminated from the record disc, and the record disc is kept in close contact with the turntable, either by placing a weight on the record disc at the center thereof or alternatively by depressing the peripheral portion of the record disc by means of a ring member. However, this apparatus gives rise to difficulties in that the warp of the record disc cannot be corrected completely, and that the manual operations involved are rather troublesome. Moreover, in another of such apparatuses, a sheet on the turntable is adapted to undergo deformation in conformance with the warp of the record disc placed thereon. The apparatus, however, has a shortcoming in that the warp of the record disc cannot be corrected, and that wow and distortion introduced cannot be eliminated.

Hence, in order to solve and eliminate the above described problems, a novel and useful turntable device having rotary recording medium size changeover capability in a rotary recording medium reproducing apparatus has been proposed in a U.S. Pat. No. 4,234,195 entitled "APPARATUSES FOR REPRODUCING SIGNALS FROM ROTARY RECORDING MEDIUMS" issued Nov. 18, 1980, in which the assignee is the same as that of the present application. According to one embodiment of a turntable device described in the above U.S. patent, the rotary recording medium is adhered onto a rotary structure such as a turntable sheet or a turntable by suction, due to the sucking action of a suction pump, to correct the warp of the rotary recording medium. According to this turntable device, the rotary recording medium can be reproduced in a warp-free state, and the placing or removing of the rotary recording medium to or from the turntable can be performed without any difficulty.

Furthermore, as another embodiment of a turntable device, the above U.S. patent disclosed a turntable device in which the area over which suction is applied at the upper surface of a rotary structure such as a turntable on which the rotary recording medium is placed, can be appropriately varied. According to this device, not only large size rotary recording mediums but also small size rotary recording medium can be drawn against the rotary structure under suction.

However, in the above turntable device in which the turntable sheet is composed of a rotary plate having a small diameter and a ring plate fitted around the periphery of the rotary plate, and suction grooves of a predetermined pattern are provided in the respective rotary plate and the ring plate, and further, the angular positions of the respective rotary plate and the ring plate are appropriately varied in order to cope with the various sizes of the rotary recording mediums which are to be adhered onto the turntable sheet by suction, there were disadvantages in that the manufacturing process and the operation of the device were troublesome and the cost of the device became high, since the turntable sheet is composed of two different sheets.

In addition, in the above turntable device in which suction grooves are respectively formed on both sides of the turntable sheet so that the allowable suction range provided by the turntable sheet corresponds to the different diameters of the rotary recording mediums, to positively adhere rotary recording medium of two different sizes by turning over the turntable sheet, there were problems in that the turntable sheet could only be used for two kinds of rotary recording mediums by performing the above operation in which the turntable sheet is turned over, and that the above operation to turn over the turntable sheet was troublesome. Moreover, when a rotary recording medium of a larger size is to be adhered onto the turntable sheet, the rotary recording medium was only adhered onto the turntable sheet under suction by the suction grooves provided for the rotary recording medium of a smaller size. Thus, the outer peripheral parts of the rotary recording medium of the larger size were not adhered with respect to the turntable sheet, and mixed oscillation modulation and the like which are introduced due to vibrations in the rotary recording medium, could not sufficiently be suppressed.

As another example of a turntable device, there is a device which copes with the different sizes of the rotary recording mediums which are to be adhered onto the turntable sheet, similar to devices used for cutting a record disc. However, the cost of this type of turntable device is exceedingly high, and cannot be applied to a normal rotary recording medium reproducing apparatus.

SUMMARY OF THE INVENTION

Accordingly, a general object of the present invention is to provide a novel and useful turntable device having rotary recording medium size changeover capability in a rotary recording medium reproducing apparatus, in which the above described problems have been eliminated.

Another and more specific object of the present invention is to provide a turntable device having rotary recording medium changeover capability in a rotary recording medium reproducing apparatus, which is capable of positively adhering rotary recording mediums having different sizes onto the upper surface of a turntable sheet in a state where the lower surface of the turntable sheet is always adhered substantially throughout the entire surface with respect to a turntable, by a simple setting operation in which the turntable sheet is rotated by a small amount. According to the turntable device of the present invention, the turntable device can be constructed to positively adhered more than four kinds of rotary recording mediums respectively having different sizes.

Further objects and features of the present invention will be apparent from the following detailed description when read in conjunction with the accompanying drawings.

BRIEF DESCRIPTION OF THE DRAWINGS

FIG. 1 is a plan view of an embodiment of a turntable which can be applied to a turntable device having rotary recording medium size changeover capability in a rotary recording medium reproducing apparatus according to the present invention;

FIG. 4 is a plan view of another embodiment of a turntable which can be applied to a turntable device having rotary recording medium size changeover capability in a rotary recording medium reproducing apparatus according to the present invention.

DETAILED DESCRIPTION

Figure 2:
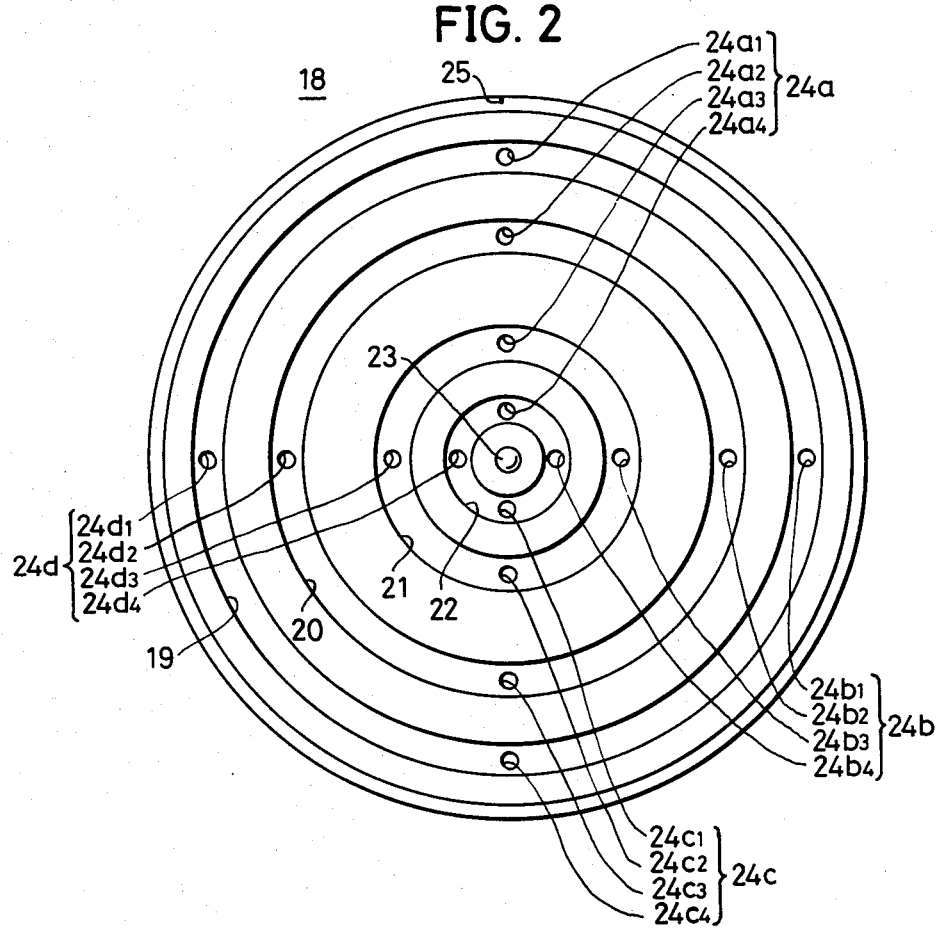
FIG. 2 is a plan view of an embodiment of a turntable sheet which can be applied to a turntable device having rotary recording medium size changeover capability in a rotary recording medium reproducing apparatus according to the present invention.

In FIG. 1, a turntable 11 which is driven and rotated by a driving source (not shown), is provided with a circular groove 12 in the upper surface of the turntable 11 in the vicinity of the outer periphery thereof. The diameter of the groove 12 can be slightly larger than 30 centimeters. A tapered, circular depression 13 having a large depth, is formed near the center of the turntable 11. Further, grooves 14a through 14d which connect the groove 12 and the tapered depression 13, are formed on the turntable 11 in radial directions of the turntable 11 to form a cross shape. Moreover, branching arcuate grooves 15a and 15b respectively having relatively small and large lengths extend in the clockwise direction from each of the grooves 14a through 14d, in the turntable 11. The respective diameters of the inner walls of the branching arcuate grooves 15a and 15b, are slightly smaller than 25 centimeters and 17 centimeters, respectively.

Figure 3:
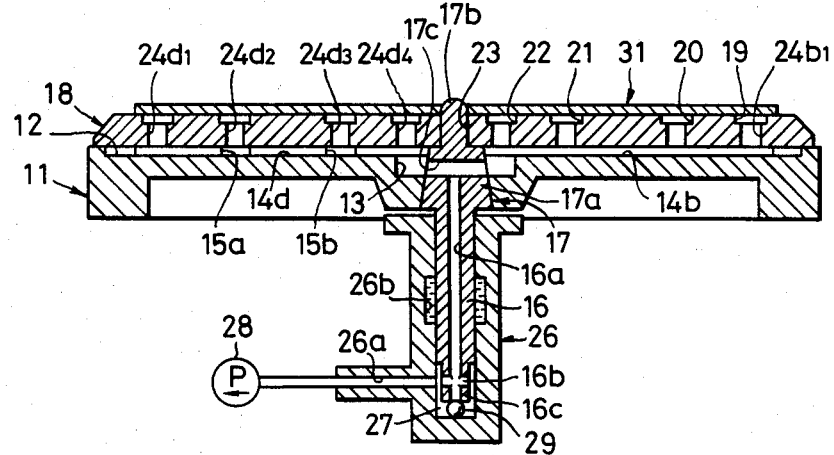
FIG. 3 is a cross-sectional view of the turntable and the turntable sheet respectively shown in FIGS. 1 and 2 in an assembled state, where a rotary recording medium having a diameter of 30 centimeters is placed onto the turntable sheet.

Three different markings "A", "B", and "C" are respectively provided for different rotary recording medium sizes of 30, 25, and 17 centimeters, at positions in the vicinity of the outer peripheral part of the turntable 11, marking A extending radially along the center line of the groove 14a, marking B along the end edge of the branching arcuate groove 15a of the groove 14a, and marking C along the end edge of the branching arcuate groove 15b. The purpose of these markings "A", "B", and "C" will be described hereinafter. As shown in FIG. 3, the turntable 11 is fitted over an outer tapered portion 17a of a tapered part 17 provided at the upper end of a spindle 16 of a reproducing apparatus, by entry of tapered portion 17a into the tapered opening 13a provided within the depression 13. The tapered part 17 further comprises a suction opening 17c which opens at an upper end spindle portion 17b and communicates with the tapered depression 13.

The spindle 16 is rotatably supported in a bearing body 26, which is of cylindrical shape and has a bottom fixed to the reproducing apparatus structure. The bottom surface of the spindle 16 is supported by a steel ball 29. The spindle 16 is formed with an axial opening 16a. The spindle 16 further has a lower opening 16b, and both the openings 17c and 16b both of extend in a diametric direction and communicate with the axial opening 16a near the upper and lower ends thereof respectively. The lower opening 16b extends in a part 16c of the spindle 16 having a smaller diameter, and opens into a space 27 formed between the smaller diameter part 16c and the bearing body 26. The bearing body 26 is formed with an opening 26a which is communicatively connected with the space 27 at one end and connected with a suction pump 28 at the other end. The bearing body 26 is further formed with a grease chamber 26b.

The above described openings 17c, 16a, 16b and 26a cooperatively serve as a suction conduit or pipe for the suction pump 28.

An embodiment of a turntable sheet 18 is shown in FIG. 2. As shown in FIG. 2, circular grooves 19 through 21 having diameters which are respectively slightly smaller than 30, 25, and 17 centimeters, are respectively formed in the upper surface of the turntable sheet 18. In addition, the turntable sheet 18 is also provided with a circular groove 22 which has a smaller diameter than the groove 21, and a central opening 23 at the center thereof. Four rows of hole groups 24a through 24d are respectively formed in each of the grooves 19 through 22, in radial directions in a cross form, along lines which divide the surface of the turntable sheet 18 into four equal portions. The hole groups 24a through 24d respectively comprise holes 24a1 through 24a4, holes 24b1 through 24b4, holes 24c1 through 24c4, and holes 24d1 through 24d4. Furthermore, a marking 25 is formed at the outer peripheral part of the turntable sheet 18, at a position radially aligned with the row of the hole group 24a.

The turntable sheet 18 is assembled above the turntable 11 in a state where the upper end spindle 17b of the tapered part 17 is inserted into the central opening 23, as shown in FIG. 3. In this case, assuming that the turntable sheet 18 is rotated with respect to the turntable 11 so that the marking "A" of the turntable 11 coincides with the marking 25 of the turntable sheet 18 to enable reproduction of a rotary recording medium having a diameter of 30 centimeters, for example, each of the hole groups 24a through 24d of the turntable sheet 18 respectively open through the grooves 14a through 14d of the turntable 11.

When a recording medium 31 having a diameter of 30 centimeters is fitted on the upper end spindle 17b and placed on the turntable sheet 18 as shown in FIG. 3, the rotary recording medium 31 covers all the grooves 19 through 22 of the turntable sheet 18. Accordingly, when the suction pump 28 is oprated, the air in all the grooves 19 through 22, all the hole groups 24a through 24d of the turntable sheet 18, and the grooves 12, and 14a through 14d of the turntable 11 is withdrawn externally through the suction opening 17c, the axial opening 16a and the lower opening 16b of the spindle 16. In this state, the rotary recording medium 31 having a diameter of 30 centimeters is adhered to the upper surface of the turntable sheet 18 within a range corresponding to the grooves 19 through 22, that is, substantially all the surface of the rotary recording medium 31 which confronts the turntable sheet 18 is adhered to the turntable sheet 18. In addition, the turntable sheet 18 is adhered to the turntable 11 within a range encircled by the groove 12 of the turntable 11, that is, substantially all the surface of the turntable sheet 18 which confronts the turntable 11 is adhered to the turntable 11. Therefore, the rotary recording medium 31 having a diameter of 30 centimeters, can be reproduced in a state where the introduction of cross modulation due to oscillation caused by vibrations in the rotary recording medium 31 which is picked up by a reproducing stylus, acoustic vibrative cross modulation, howling, and the like, are prevented.

Next, when a recording medium having a diameter of 25 centimeters is to be reproduced, the turntable sheet 18 is rotated by a small amount in the clockwise direction so that the mark 25 of the turntable sheet 18 coincides with the marking "B" of the turntable 11. In this state, holes 24a1, 24b1, 24c1, and 24d1 of the hole groups 24a through 24d which are respectively provided at the outermost peripheral part of the turntable sheet 18 do not confront the grooves 14a through 14d of the turntable 11. Therefore, the holes 24a1, 24b1, 24c1, and 24d 1 are respectively closed. On the other hand, the holes 24a2, 24b2, 24c2, 24d2, 24a3, 24b3, 24c3, and 24d3 respectiely do not confront the grooves 14a through 14d of the turntable 11, however, these holes 24a2 through 24d3 are respectively open to the branching arcuate grooves 15a through 15b of the turntable 11. Furthermore, the holes 24a4, 24b4, 24c4, and 24d4 provided at the innermost part of the turntable sheet 18, are respectively open to the tapered depression 13 of the turntable 11.

Upon placing of the rotary recording medium having a diameter of 25 centimeters onto the turntable sheet 18, the outermost peripheral part of the turntable sheet 18 is not covered by the rotary recording medium. In this state, only the grooves 20 through 22 of the turntable sheet 18 is covered by the rotary recording medium, and the groove 19 remains uncovered. Accordingly, when the suction pump 28 is operated, the air in the grooves 20 through 22, and holes 24a2 through 24a4, 24b2 through 24b4, 24c2 through 24c4, and 24d2 through 24d4 of the turntable sheet 18, is withdrawn externally through the branching arcuate grooves 15a and 15b, and the tapered depression 13 of the turntable 11. Hence, good reproduction can be obtained, in a state where substantially all the surface of the rotary recording medium confronting the turntable sheet 18 is positively adhered to the turntable sheet 18. Further, although the groove 19 of the turntable sheet 18 is exposed in this state, the holes 24a1 through 24d1 of the turntable sheet 18 are respectively closed as described above, and a positive suction is obtained in which no air is drawn from these holes 24a1 through 24d1.

Similarly, when a rotary recording medium having a diameter of 17 centimeters is to be reproduced, the turntable sheet 18 is rotated in the clockwise direction so that the marking 25 coincides with the marking "C" of the turntable 11. In this state, the holes 24a1 through 24d1 and 24a2 through 24d2 of the hole groups 24a through 24d which are respectively provided in the turntable sheet 18, do not confront the grooves 14a through 14d or the branching arcuate grooves 15a of the turntable 11. Therefore, the holes 24a1 through 24d1 and 24a2 through 24d2 are respectively closed, and only the holes 24a3 through 24d3 of the turntable sheet 18 are respectively open to the branching arcuate grooves 15b.

Accordingly, when a rotary recording medium having a diameter of 17 centimeters is placed onto the turntable sheet 18, the rotary recording medium only covers the grooves 21 and 22, and the grooves 19 and 20 of the turntable sheet 18 are not covered. These grooves 19 and 20 of the turntable sheet 18 is exposed, however, due to similar operations as those performed above, the air in the grooves 21 and 22 of the turntable sheet 18 is withdrawn externally through the holes 24a3 through 24d3 and 24a4 through 24d4 by the suction pump 28. Hence, no air is drawn from the holes 24a1 through 24d1 and 24a2 through 24d2, and a positive suction can accordingly be obtained. The rotary recording medium is thus positively adhered onto the turntable sheet 18.

As described above, by a simple setting operation is which the turntable sheet 18 is rotated by a small amount, the turntable device can be changed over to be adapted to positively adhere rotary recording medium of different sizes to the turntable sheet 18. Furthermore, regardless of the size of the rotary recording medium, the turntable device can be constructed to positively adhered substantially all the surface of the rotary recording medium opposing the turntable sheet 18.

FIG. 4 shows another embodiment of a turntable which can be applied to a turntable device according to the present invention. In FIG. 4, parts which are the same as those corresponding parts in FIG. 1 are designated by like reference numerals, and their description will be omitted. In a turntable 33 shown in FIG. 4, curved grooves 34a through 34d are provided instead of the grooves 14a through 14d and the branching arcuate grooves 15a and 15b of the turntable 11 shown in FIG. 1.

When the turntable sheet 18 shown in FIG. 2 is rotated by a small amount and adjusted so that the marking 25 coincides with the marking "A" of the turntable 33, the holes 24a1 through 24d1, and the holes 24a4 through 24d4 of the turntable sheet 18 are respectively open to the curved grooves 34a through 34d, and the tapered depression 13 of the turntable 33. Therefore, when a rotary recording medium having a diameter of 30 centimeters is placed onto the turntable sheet 18, the rotary recording medium is positively adhered to the turntable sheet 18 as in the above described cases. In this case, the holes 24a2 through 24d2 and 24a3 through 24d3 of the turntable sheet 18 respectively are not open to the curved grooves 34a through 34d of the turntable 33, and the suction introduced by the suction pump 28 is not as strong as in the above described case wherein the turntable 11 shown in FIG. 1 is used, however, no problems are introduced from a practical point of view.

Similarly, when reproducing a rotary recording medium having a diameter of 25 or 17 centimeters, the holes 24a2 through 24d2 or the holes 24a3 through 24d3 of the turntable sheet 18 are respectively open to the curved grooves 34a through 34d of the turntable 33, in addition to the holes 24a4 through 24d4 which respectively open to the tapered depression 13 of the turntable 33. Accordingly, reproduction of the rotary recording medium can be performed in a state where the rotary recording medium is positively adhered to the turntable sheet 18.

The above construction of the curved grooves 34a through 34d of the turntable 33 can be applied to the arrangement of the hole groups 24a through 24d of the turntable sheet 18. When a turntable sheet of the above arrangement is used together with the turntable 11 shown in FIG. 1, the desired openings (holes) can be opened to predetermined grooves, to positively adhere a rotary recording medium of a predetermined size (diameter).

In the above described embodiments of the invention, the turntable device was constructed so that the turntable device can be changed over to positively adhere rotary recording mediums having three different sizes. However, by varying the number and shape of the grooves in the turntable and the turntable sheet, the turntable device can be constructed to positively adhere more than four kinds of rotary recording mediums, each having different sizes.

Moreover, a second sheet can be provided between the turntable 11 (33) and the turntable sheet 18, where the above second sheet is provided with grooves having the same groove pattern as that formed in the turntable 11 (33). In this case, the suction is obtained through the two sheets, that is, the turntable sheet and the second sheet, to positively adhere the rotary recording medium onto the turntable sheet. In addition, the turntable and the second sheet must be formed unitarily (or mutually adhered), and the second sheet can be considered as a part of the turntable.

Further, this invention is not limited to these embodiments but various variations and modifications may be made without departing from the scope of the invention as defined in the appended claims.

What is claimed is:

1. A turntable device having rotary recording medium size changeover capability in a rotary recording medium reproducing apparatus, said turntable device comprising:
a turntable adapted to be driven in rotation, said turntable having an upper surface, a turntable sheet carried on said upper surface of said turntable,
said turntable sheet having an upper surface for carrying and supporting a rotary recording medium thereon for unitary rotation therewith:
a spindle for said turntable;
air suction means; and
communicating structure means for providing communication between said air suction means and enclosed spaces formed between said turntable sheet and said rotary recording medium;
said turntable sheet having holes provided at positions along different radial directions thereof according to different sizes of said rotary recording medium, said holes extending through said turntable sheet, and a plurality of suction grooves of predetermined patterns communicating with said holes, said turntable sheet being angularly adjustable to different angular positions on said turntable according to the size of said rotary recording medium,
said turntable having grooves of a pattern communicating with the holes of said turntable sheet at positions according to the size of said rotary recording medium, in accordance with different angular positions of said turntable sheet carried on the upper surface of said turntable according to the size of said rotary recording medium;
the arrangement of the grooves in the turntable and the holes in the turntable sheet being such that the angular adjustment of the turntable sheet as a unit will place the entire turntable sheet in a plurality of selected positions each of which corresponds to a particular diameter of recording medium and establishes selective communication between the holes in the sheet and the grooves in the turntable to provide suction at the upper surface of the turntable sheet over a diametral extent corresponding to the particular diameter of the recording medium.

2. A turntable device as claimed in claim 1 in which said holes in said turntable sheet includes holes which become inoperative due to the angular setting of said turntable sheet, which inoperative holes are closed by the upper surface of said turntable.

3. A turntable device as claimed in claim 2 in which said suction grooves of said turntable sheet comprises a circular groove formed in the vicinity of the innermost part of said turntable sheet, and a group of circular grooves of a number according to the number of different size rotary recording mediums which are to be reproduced, and each of the said group of circular grooves has a diameter selected slightly smaller than the diameter of the rotary recording medium of the corresponding size.

4. A turntable device as claimed in claim 1 wherein said communicating structure means comprises passage means in said spindle establishing communication between said air suction means and communicating holes and grooves in said turntable and turntable sheet to apply suction to said recording medium placed on said turntable sheet via the holes in said turntable sheet to hold the recording medium against said turntable sheet while concurrently establishing suction between the grooves in the turntable and the holes in the turntable sheet to hole the turntable sheet against said turntable.

5. A turntable device as claimed in claim 1 comprising marking means for indicating the respective angular positions of said turntable and said turntable sheet corresponding to the different sizes of the rotary recording media, said holes and grooves in said turntable sheet and said grooves in said turntable being in respective communication corresponding to the different sizes of said rotary recording media according to said angular positions indicated by said marking means.

6. A turntable device having rotary recording medium size changeover capability in a rotary recording medium reproducing apparatus, said turntable device comprising:
- a turntable adapted to be driven in rotation, said turntable having an upper surface;
- a turntable sheet carried on said upper surface of said turntable, said turntable sheet having an upper surface for carrying and supporting a rotary recording medium thereon for unitary rotation therewith;
- a spindle for said turntable;
- air suction means; and
- communicating structure means for providing communication between said air suction means and enclosed spaces formed between said turntable sheet and said rotary recording medium; said turntable sheet having holes provided at positions along different radial directions thereof according to different sizes of said rotary recording medium, said holes extending through said turntable sheet, and a plurality of suction grooves of predetermined patterns communicating with said holes,
- said turntable sheet being angularly adjustable to different angular positions on said turntable according to the size of said rotary recording medium,
- said turntable having grooves of a pattern communicating with the holes of said turntable sheet at positions according to the size of said rotary recording medium, in accordance with said different angular positions of said turntable sheet carried on the upper surface of said turntable,
- said holes in said turntable sheet including holes which become inoperative due to the angular setting of said turntable sheet, which inoperative holes are closed by the upper surface of said turntable,
- said grooves of said turntable comprising a first circular groove formed in the vicinity of the outermost peripheral part of said turntable, a second circular groove formed in the vicinity of the innermost part of said turntable, and radial grooves connecting said first and second circular grooves, said first circular groove having a diameter selected slightly larger than the maximum diameter of the rotary recording medium which is to be reproduced, said radial grooves having a predetermined number of branching arcuate grooves according to the number of different size rotary recording mediums which are to be reproduced and according to the positions and the number of said holes provided in said turntable sheet.

7. A turntable device having rotary recording medium size changeover capability in a rotary recording medium reproducing apparatus, said turntable device comprising:
- a turntable adapted to be driven in rotation, said turntable having an upper surface;
- a turntable sheet carried on said upper surface of said turntable said turntable sheet having an upper surface for carrying and supporting a rotary recording medium thereon for unitary rotation therewith;
- a spindle for said turntable;
- air suction means; and
- communicating structure means for providing communication between said air suction means and enclosed spaced formed between said turntable sheet and said rotary recording medium;
- said turntable sheet having holes provided at positions along different radial directions thereof according to different sizes of said rotary medium, said holes extending through said turntable sheet, and a plurality of suction grooves of predetermined patterns communicating with said holes,
- said turntable sheet being angularly adjustable to different angular positions on said turntable according to the size of said return recording medium;
- said turntable having grooves of a pattern communicating with the holes of said turntable sheet at positions according to the size of said rotary recording medium, in accordance with said different angular positions of said turntable sheet carried on the upper surface of said turntable,
- said holes in said turntable sheet including holes which become inoperative due to the rotational setting of said turntable sheet, which inoperative holes are closed by the upper surface of said turntable,
- said grooves of said turntable comprising a first circular groove formed in the vicinity of the outermost peripheral part of said turntable, a second circular groove formed in the vicinity of the innermost part of said turntable, and curved grooves connecting said first and second circular grooves, said first circular groove having a diameter slightly larger than the maximum diameter of the rotary recording medium which is to be reproduced,
- said curved grooves having a curvature conforming to the number of different size rotary recording mediums which are to be reproduced and to the positions and the number of said holes in said turntable sheet.

* * * * *